United States Patent Office 3,414,755
Patented Dec. 3, 1968

3,414,755
EROSION PREVENTION IN GAS-FILLED ELECTRIC DISCHARGE DEVICE
Basil Offor Baker, Rickmansworth, and Robert Joseph Wheldon, Chalfont St. Peter, England, assignors to The M-O Valve Company, Limited, London, England, a British company
Filed July 11, 1966, Ser. No. 564,279
Claims priority, application Great Britain, July 9, 1965, 29,319/65
8 Claims. (Cl. 313—193)

ABSTRACT OF THE DISCLOSURE

A gas-filled electric discharge device including an electrode in which is formed an elongated aperture through which the discharge passes, a region of the aperture being of reduced width so as to reduce erosion of an adjacent electrode which would otherwise occur due to focussing of high energy electrons onto the surface of the adjacent electrode by virtue of the configuration of the electric field in operation between the region of the aperture and the adjacent electrode.

---

Figures 1, 2:
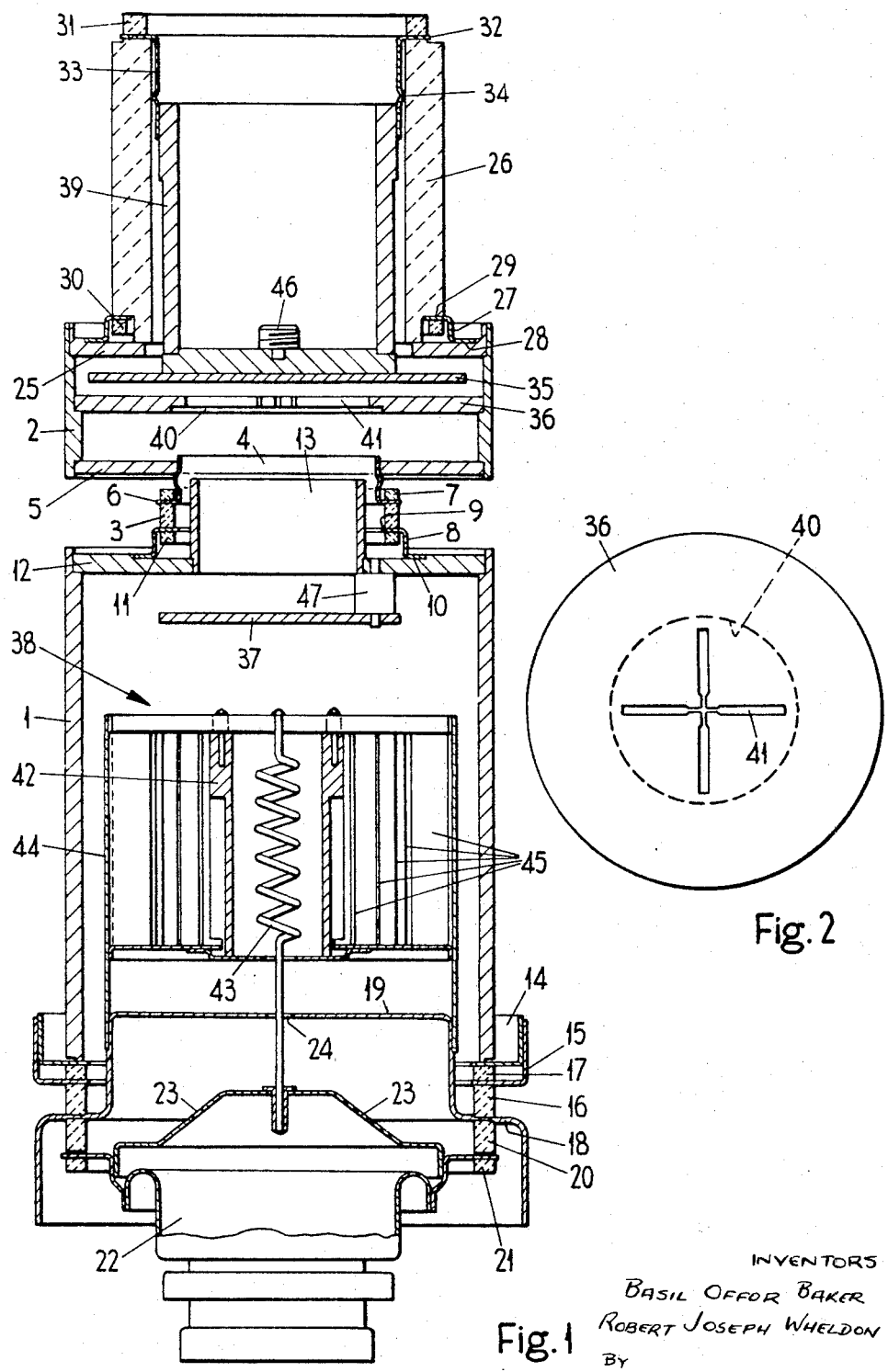

This invention relates to electric discharge devices having a filling of gas.

The invention relates particularly to electric discharge devices of the kind having a filling of gas and including an electrode structure comprising a first pair of electrodes, for example an anode, and a cathode, and a further electrode, for example, a control electrode, in which is provided at least one elongated aperture through which the discharge between said first pair of electrodes passes in operation, the further electrode serving to constrict the cross-sectional area of the path available for the discharge.

In this specification the term gas is intended to include vapour.

It has been found in the use of known electric discharge devices of the kind specified that if, as is frequently the case, the further electrode is maintained during periods when the device is beginning to conduct at a large negative potential with respect to one of the first pair of electrodes, appreciable erosion of the surface of that one of the first pair of electrodes is liable to occur. It is an object of the present invention to provide a construction of device whereby such erosion is substantially reduced.

According to the present invention, in an electric discharge device of the kind specified, in a region of a said aperture between which and one of said first pair of electrodes the configuration of the electric field in operation is such as to cause pronounced focussing of electrons passing through said region of the aperture onto the surface of said one of the first pair of electrodes, said aperture is of reduced width.

Said aperture is suitably of substantially uniform width over the major part of its length.

In a preferred arrangement in accordance with the invention, said aperture in the further electrode comprises at least three elongated limbs which extend outwardly from a central opening in the further electrode, and each limb is of reduced width adjacent its inner end. Preferably the limbs are straight and are of substantially the same length, and the angle between the pairs of adjacent limbs are substantially equal. With such arrangements the problem of dissipating heat generated at the further electrode in operation is appreciably lessened, said further electrode suitably comprising a planar metal member mounted in good thermal contact with the internal surface of a metal part of the envelope of the device.

One arrangement in accordance with the invention will now be described, by way of example, with reference to the accompanying drawings in which:

FIGURE 1 is a sectional elevation of a thyratron having a forward hold-off voltage of 35 kilovolts and adapted to pass a peak current of 5000 amps, and FIGURE 2 is a plan view of an electrode of the thyratron.

The thyratron has a sealed envelope filled with deuterium at a pressure of 0.25 torr.

Referring to the drawing, the main body of the envelope is in the form of a hollow, generally cylindrical structure incorporating two tubular metal members 1 and 2 of lengths 4.5 inches and 1.5 inches respectively and each having an internal diameter of 3.75 inches, apart from slight variations in diameter for the purpose of providing locating shoulders at various positions. The two tubular members 1 and 2 are disposed in axial alignment and the communicate via a relatively short, narrow, tubular ceramic section 3 of the envelope. At one end, the ceramic section 3 is joined to the shorter tubular metal member 2 by means of a thin-walled tubular metal sealing ring 4 which at one end is sealed to the inner edge of a flange 5 extending inwardly from the adjacent end of the tubular member 2, and at its other end is provided with an outwardly extending flange 6 which is sandwiched between the adjacent end of the ceramic section 3 and a ceramic backing ring 7. At its other end the ceramic section 3 is joined to the longer tubular metal member 1 by means of a thin-walled tubular metal sealing ring 8 having an inwardly extending flange 9 at one end and an outwardly extending flange 10 at the other end, the inwardly extending flange 9 being sandwiched between the adjacent end of the ceramic section 3 and a ceramic backing ring 11 and the outwardly extending flange 10 being sealed to the face of an inwardly extending flange 12 provided at the adjacent end of the tubular member 1.

To shield the inner surfaces of the ceramic section 3 and the backing ring 11 from the discharge in operation, a short tubular metal member 13 is disposed coaxially within the ceramic section 3, this member 13 being joined at one end to the inner edge of the flange 12.

At its end remote from the ceramic section 3 of the envelope, the longer tubular member 1 is sealed to an annular cup-shaped metal sealing ring 14 which nests within and is sealed to a second annular cup-shaped metal sealing ring 15. The sealing ring 15 is sealed in turn to one end of a ceramic ring 16 with the aid of a backing ring 17, and the other end of the ceramic ring 16 is sealed to one main face of an outwardly extending flange 18 formed around the mouth of a cup-shaped metal member whose base extends across the end of the main body of the envelope. The other main face of the flange 18 is sealed to one end of a further ceramic ring 20 whose other end is sealed with the aid of a backing ring 21 to a compartment 22 which serves to close this end of the envelope and which houses a replenisher for the gas filling of the thyratron. The replenisher communicates with the interior of the main body of the envelope via four apertures 23 in the end of the replenisher compartment 22 and an aperture 24 formed through the base of the member 19.

At the end of the shorter tubular member 2 remote from the ceramic section 3 of the envelope there is provided an inwardly extending flange 25 to which a tubular ceramic member 26 is joined by means of a thin-walled tubular metal sealing ring 27. The sealing ring 27 is provided at one end with an outwardly extending flange 28 which is sealed to the flange 25, and at its other end is provided with an inwardly extending flange 29 which is sandwiched between the end of the ceramic member 26 and a ceramic backing ring 30. The ceramic member 26 has an internal diameter of 2.38 inches and a length of 3.0 inches. The end of the ceramic member 26 remote from the main body of the envelope is sealed with the aid of a backing ring 31 to a flange 32 provided at one end of a thin-walled tubular metal closure member 33 which is disposed coaxially within the ceramic member 26. The closure member 33 has an external diameter of 2.31 inches and a length of 1.0 inch, and is provided with outwardly projecting pips 34 half-way along its length which serve to locate it within the ceramic member 26, during manufacture.

The electrode system of the thyratron is housed within the main body of the envelope and comprises an anode 35, a control electrode 36, a baffle 37, and a cathode 38.

The anode 35 is in the form of a molybdenum disc of diameter 3.56 inches which is housed within the shorter tubular member 2 and is supported at one end of a metal tube 39. The tube 39 extends perpendicularly away from the anode 35 coaxially through the tubular ceramic member 26 to a plane about one third along the length of the closure member 33, the tube 39 being sealed coaxially within the closure member 33 where these two members 33 and 39 overlap, thereby closing this end of the envelope.

The control electrode 36 comprises a copper disc which is sealed into the shorter tubular member so that the main face of the disc nearer the anode 35 is parallel to and spaced 0.16 inch from the adjacent main face of the anode. The control electrode 36 has a thickness of 0.15 inch but is recessed on its side adjacent the cathode to provide a central circular area 40 of diameter 2.0 inches having a thickness of 0.08 inch. Referring now to FIGURES 1 and 2, in the area 40 there is formed centrally a cross-shaped aperture 41. Each of the four limbs of the aperture 41 has a length of 0.885 inch and a width of 0.08 inch for a distance of 0.75 inch from its outer extremity, the width then tapering linearly to 0.04 inch over a distance of 0.04 inch and remaining at this value for the rest of the length of the limb.

The baffle 37 comprises a molybdenum disc of thickness 0.08 inch and diameter 2.25 inches disposed within the longer tubular member 1 in a plane perpendicular to the axis of the envelope. The baffle 37 is mounted, by means of a copper support 47, on and in good electric and thermal contact with the flange 12 on the tubular member 1 at a distance of 0.375 inch from the flange 12.

The cathode 38 is also housed within the tubular member 1 and is of the type described in the specification of our Patent No. 3,244,925. The cathode 38 essentially comprises a hollow cylindrical member 42 made of electron emitting material in which is housed an electric heater 43. The cathode 38 is supported coaxially within a metal heat shield 44 which is generally tubular in shape and at its end remote from the anode 35 is mounted on the cup-shaped metal member 19.

The heat shield 44 is provided with a series of spaced rectangular fins 45 which project radially inwards, the fins 45 being approximately the same length as the cathode 38. The internal surface of the heat shield 44 and the surfaces of the fins 45 are coated with electron emissive material derived from the cathode 38, deposition of this material being effected during manufacture of the thyratron.

Connection to the control electrode 36 is made via the tubular member 2, connection to the cathode 38 and one end of the cathode heater is made via the metal member 19, connection to the other end of the cathode heater is made via a metal part of the envelope of the replenisher compartment 22 and connection to an electrical heating element (not shown) included in the replenisher is also made in this way. Connection to the anode 35 is made via a threaded metal boss 46 provided at the inner end of the tube 39.

In operation of the thyratron a voltage of the order of 35 kilovolts is applied between the anode 35 and the cathode 38, the anode 35 being positive with respect to the cathode 38. To hold the thyratron in a non-conducting condition the control electrode 36 is maintained at substantially the same potential as the cathode 38 and the thyratron is fired by the application of a positive voltage pulse to the control electrode 36, the resulting discharge passing through the aperture 41 in the control electrode 36.

The mechanism by which erosion of the anode 35 is produced in operation is thought to be as follows:

A short period elapses between the application of a firing pulse and the collapse of the anode to cathode voltage. During this period high energy electrons situated in the region of the control electrode 36 are swept into collision with anode 35 causing local heating of the anode. The energy for this heating is believed to come from the discharge of the inter-electrode capacitances of the thyratron. The configuration of the electric field between the anode 35 and the control electrode 36 in the region of the aperture 41 is such that these electrons are focussed onto particular regions of the anode 35 causing erosion in these regions, the effect being particularly pronounced in respect of electrons passing through the central region of the control grid aperture 41.

To reduce the erosion the width of the control electrode aperture 41 is reduced in the central region of the aperture 41; as a result, fewer electrons are available for focussing where the focussing effect is most pronounced with consequent reduction in erosion of the anode 35.

By virtue of the shape of the aperture 41 there exists between every part of the edge of the aperture 41 and the shorter tubular member 2 a direct path via the material of the control electrode 36 whose length is less than the radius of the control electrode 36. As a result, heat generated in the control electrode 36 due to the passage of a discharge is rapidly conducted via the control electrode 36 to the external surface of the shorter tubular member 2, and is thus dissipated.

It will be appreciated that in other arrangements in accordance with the invention the further electrode may be other than a control electrode and the adjacent electrode on which erosion is liable to occur may be other than an anode. For example, in a device having an auxiliary anode disposed between a main anode and a control electrode, the auxiliary anode and control electrode being both apertured but their apertures being out of register when viewed in a direction perpendicular to the plane of the control electrode, the control electrode aperture may be dimensioned in accordance with the invention to reduce erosion of the auxiliary anode and the auxiliary anode aperture may be dimensioned in accordance with the invention to reduce erosion of the main anode.

It will be understood that in other arrangements in accordance with the invention the aperture in the further electrode may be other than cross-shaped.

The slot may, for example, be arcuate in shape; in this case the focussing effect is most pronounced at the ends of the aperture and in accordance with the invention the width of the aperture is reduced adjacent its ends. In addition, the further electrode in a device in accordance with the invention may be provided with more than one aperture which is dimensioned in accordance with the invention.

We claim:

1. An electric discharge device comprising a sealed envelope; a gas filling contained within the envelope, and an electrode structure housed within the envelope; the electrode structure comprising a first pair of electrodes between which a discharge passes in operation; and a further electrode which is electrically insulated from at least one of said first pair of electrodes and has formed in it at least one elongated aperture through which the discharge between said first pair of electrodes passes; said aperture being so shaped as to constrict the cross-sectional area of the path available for said discharge and to produce an electric field configuration between said further electrode and said one of said first pair of electrodes when at a large negative potential with respect to said one of said first pair of electrodes such that there occurs pronounced focussing of electrons passing through a small region of said aperture onto the surface of said one of said first pair of electrodes, and the part of said aperture in said region being of smaller width along its length than would be the case if the shape of the part of the aperture in said region were a natural extension of the shape of the part of the aperture outside said region.

2. An electric discharge device according to claim 1 wherein said aperture is of substantially uniform width over the part of its length outside said region.

3. An electric discharge device according to claim 1 wherein said aperture in the further electrode comprises at least three elongated limbs which extend outwardly form a central opening in the further electrode, each limb being of reduced width adjacent its inner end, and the largest cross dimension of the central opening being less than the width of any part of any limb of unreduced width.

4. An electric discharge device according to claim 3 wherein said limbs are straight, of substantially the same length, and the angles between the pairs of adjacent limbs are substantially equal.

5. An electric discharge device according to claim 4 wherein said aperture has four said limbs.

6. An electric discharge device according to claim 3 wherein the envelope of the device includes a metal portion and said further electrode comprises an apertured planar metal member mounted in good thermal contact with the internal surface of said metal portion of the envelope.

7. An electric discharge device according to claim 1 wherein said further electrode constitutes a control electrode of the device.

8. An electric discharge device according to claim 7 wherein said first pair of electrodes constitute an anode and a cathode respectively.

References Cited

UNITED STATES PATENTS

| | | | |
|---|---|---|---|
| 2,786,956 | 3/1957 | Watrous | 313—204 |
| 3,128,409 | 4/1964 | Watrous | 313—188 |
| 3,336,492 | 8/1967 | Baker et al. | 313—192 X |

JAMES W. LAWRENCE, *Primary Examiner.*

R. JUDD, *Assistant Examiner.*